United States Patent [19]

Weisgerber

[11] Patent Number: 5,627,614

[45] Date of Patent: May 6, 1997

[54] METHOD FOR IMPARTING BOTH HIGH-IMPACT CINEMATIC IMAGES AND CONVENTIONAL CINEMATIC IMAGES ON THE SAME STRIP OF MOTION PICTURE FILM

[76] Inventor: Robert C. Weisgerber, 245 E. 93d St., Suite 32A, New York, N.Y. 10128

[21] Appl. No.: 519,244

[22] Filed: Aug. 25, 1995

[51] Int. Cl.$^6$ ............... G03B 19/18; G03B 41/00; G03B 19/24

[52] U.S. Cl. ............... 352/46; 352/84; 352/97; 352/44

[58] Field of Search ............... 352/84, 46, 81, 352/97, 44, 239

[56] References Cited

U.S. PATENT DOCUMENTS

| 2,566,700 | 9/1951 | Goldsmith | 348/46 |
| 3,271,097 | 9/1966 | Montremy et al. | 352/41 |
| 3,511,567 | 5/1970 | Dejoux | 352/132 |
| 5,153,620 | 10/1992 | Songer | 352/38 |

FOREIGN PATENT DOCUMENTS

WO93/06520  4/1993  WIPO ............... G03B 1/18

Primary Examiner—Michael Gellner
Assistant Examiner—Matthew Miller
Attorney, Agent, or Firm—David Peter Alan

[57] ABSTRACT

A method is disclosed whereby film images designed to produce a high-impact effect upon the members of an audience viewing a motion picture film are composited with other images designed to provide the conventional cinematic effect upon such audience members. "High-impact" film images photographed at forty-eight frames per second are composited with "conventional" images photographed at the traditional motion picture rate of twenty-four frames per second, with such images superimposed onto the same film frame. Certain portions of the motion picture image seen by the audience deliver a greater illusion of reality than other portions of the same motion picture image. In addition, the method described can accommodate the intercutting of discrete scenes presenting either high-impact or conventional cinema experience. The method disclosed here also allows easy conversion of films to the conventional twenty-four frames per second rate associated with conventional motion picture release and distribution.

13 Claims, 2 Drawing Sheets

Figure 4

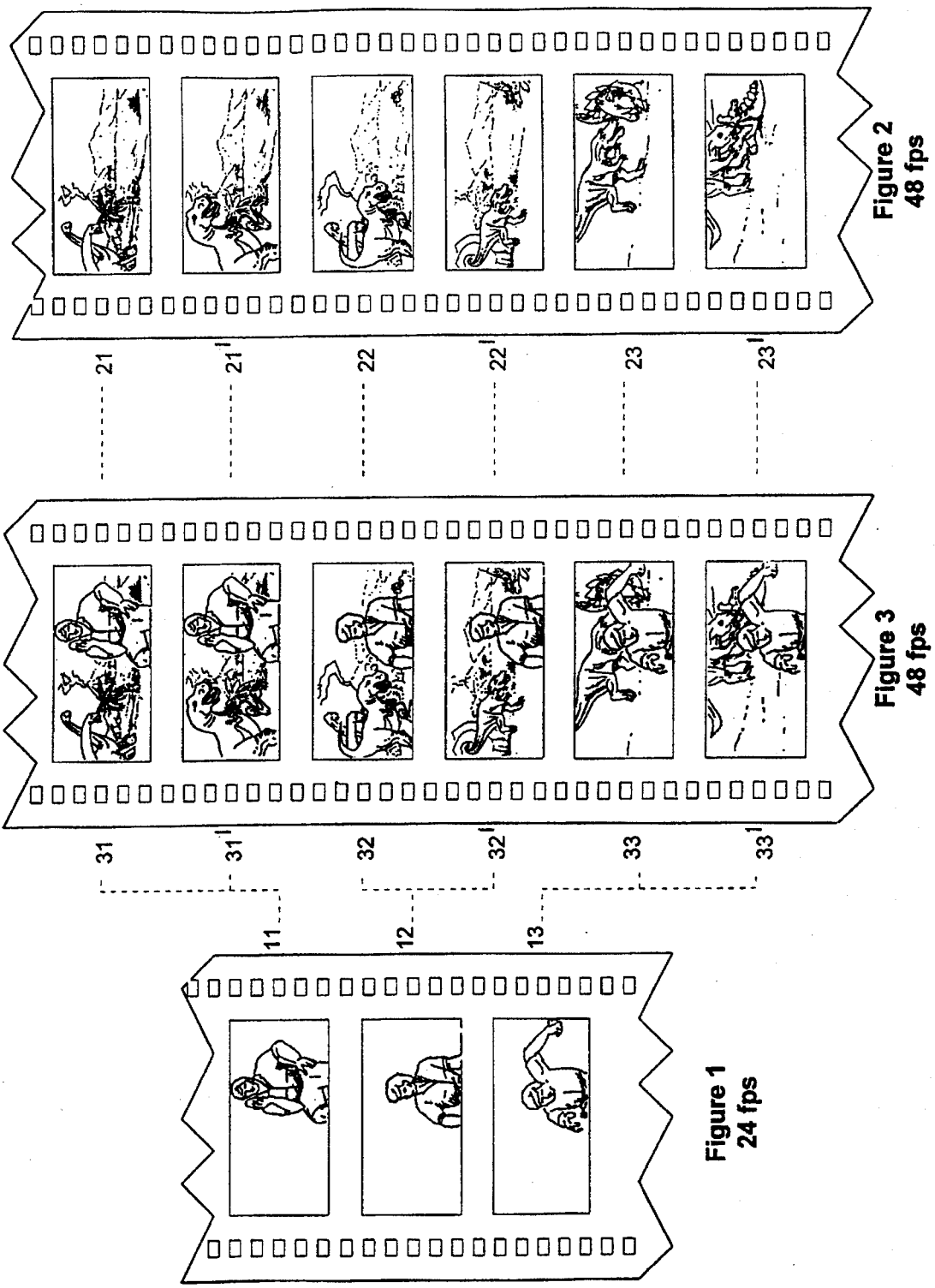

METHOD FOR IMPARTING BOTH HIGH-IMPACT CINEMATIC IMAGES AND CONVENTIONAL CINEMATIC IMAGES ON THE SAME STRIP OF MOTION PICTURE FILM

BACKGROUND OF THE INVENTION

Throughout its history, the motion picture industry has developed new technologies to make motion pictures appear more realistic to audiences than had previously been possible. The advent of sound, color and 70 mm film in the late 1920s added a dimension of realism, when compared to earlier films. The same can be said of developments from the 1950s, such as CinemaScope (wide-screen image achieved through anamorphic compression and expansion), Todd-AO (70 mm film photographed at 30 frames per second with six-channel audio) and Cinerama (three synchronized projectors operating at twenty-six frames per second, projecting films photographed at that frame rate onto a deeply curved screen). While each of these systems increased the sensory impact received by audience members, none of these systems were compatible with each other or with conventional motion picture exhibition systems then in use.

The same is true of the current high-impact systems. IMAX (15-perforation 70 mm film traveling in the horizontal direction) or SHOWSCAN (conventional 5-perforation 70 mm film at 60 fps). The large film frame of IMAX and the high speed of SHOWSCAN limit their use to a few special venues. Conversion of films recorded in these formats cannot be accomplished for use in conventional motion picture theaters without loss of the audience impact gained by use of the special format. IMAX relies on the information packing density of its large frame (70 mm with fifteen performations; three times the normal 70 mm film frame size) to overwhelm the audience and reduce the viewer's awareness of the artifacts that give a "cinematic" look to motion pictures photographed and shown at 24 fps. SHOWSCAN relies on the 60 fps frame rate to reduce the artifacts associated with 24 fps projection. In an attempt to convert 60 fps films to the conventional rate of 24 fps, Trumbull (U.S. Pat. No. 4,889,423 (1989) discloses a method for superimposing the first two images of each group of five shot at 60 fps into a single 24 fps frame, varying the exposure of the two images as superimposed. The next 24 fps frame is likewise made up of the superimposed images of the fourth and fifth frames of the group of images shot at 60 fps. Trumbull's conversion method does not work in practice, since the superimposition of images on each 24 fps frame causes objectionable strobing and blurring of moving objects seen by the viewer. Moreover, the omission of the third frame of each group of five shot at 60 fps interrupts the smooth interpolation of motion available at the higher speed, thereby causing another objectionable artifact.

It is the primary objective of the present invention to allow the mixing of images in a motion picture film that will cause the audience to perceive portions of the image as imparting a strong illusion of reality to the viewer and other portions of the image as having the conventional "cinematic" look associated with the 24 fps frame rate. This allows the audience to perceive certain portions of the images they see as more realistic than other portions of such images, thereby adding a dimensionality to the film as viewed. It is further objective of this invention to provide a means for delivering a high-impact presentation to motion picture audiences and withdrawing the high-impact feature when it is not needed or desired. It is also an objective of the invention to allow easy conversion from the format described into a conventional format for general release and distribution to exhibitors not equipped to show films made in the format described here, without causing objectionable artifacts during the conversion process.

Most silent motion pictures were photographed at 16 fps and shown through a triple-bladed shutter, to give the viewer 48 image impressions per second. With the advent of sound motion pictures, it became necessary to increase the speed of film transport to deliver sufficient sound fidelity. Viewers still saw 48 image impressions per second because frame rate was increased to 24 fps and a double-bladed shutter replaced the earlier triple-bladed shutter. The rate of 24 fps is still the industry standard for conventional exhibition. At this fame rate, there are certain artifacts imparted onto the film upon photography (stropescopic effects and a certain lack of definition, especially moving objects, which appear to blur) that remind the viewers that they are watching a motion picture, rather than live action. The difference between this "cinematic" look of the 24 fps film and the higher impact available at higher frame rates was noted by Trumbull in this original SHOWSCAN, U.S. Pat. No. 4,177,160 (1984) at col. 5, lines 44 to 58:

> When such resolution [40 line pairs per mm] is present along with a high illumination level approaching the suggested the [sic] 16.5 foot lambert level, or higher, and with the standard commercial rate of 24 frames per second is used, a bright and clear image is produced. However, in accordance with the present invention, it is found than when these factors of high resolution and light level are used, and in addition, the frame rate at which the image was photographed and later projected is at least 50 frames per second and preferable higher, than an unusual phenomenon occurs. Observers of the resulting motion picture image experience a vivid impression of realism which is greatly enhanced from the level achieved when all the factors are the same except that a slower frame rate such as 24 fps is used.

Trumbull goes on to state that the impact to which he refers is also not available with the IMAX format because of its 24 fps rate (col. 5, line 64 to col. 6, line 10).

Earlier efforts to create that highly realistic effect used the frame rate of 30 fps. Two films, *Oklahoma* and *Around the World in Eighty Days*, were commercially released in the 30 fps Todd-AO format. Despite the enhanced realism obtained, the 30 fps frame rate was abandoned because it could not be converted to conventional 24 fps exhibition, thereby preventing wide-scale production of 30 fps films. For general release and exhibition, it was necessary to have a second camera record the same scenes at 24 fps that the first camera recorded simultaneously at 30 fps. More recently, the inventor herein has disclosed a method for transitioning between two different frame rates; specifically 24 and 30 fps (Weisgerber, U.S. Pat. No. 5,096,286 (1992)). This transitioning method used selective underexposure of certain film frames to give the audience the impression of flicker and other artifacts present at the 24 fps frame rate until the film speed had completed acceleration to 30 fps. At that time, a brighter light was switched on to increase the brightness of the image as seen by the audience. The process was reversed for slowdown from 30 to 24 fps.

Noteworthy in the earlier Weisgerber invention is the means to modulate between high-impact (at 30 fps) and "conventional" film experience (at 24 fps). High-impact systems currently in use (such as IMAX and SHOWSCAN) are always "on" and cannot be withdrawn. Such continuous high-impact presentation, even when it is not desired to advance the story line of the picture, can overload the viewer with visual imput; thereby creating an unwanted artifact of its own making.

It is the "cinematic look" of films photographed and shown at 24 fps that is central to the present invention. The differences noted by Trumbull between 24 fps presentation and higher frame rate presentation are precisely the differences in level of the illusion of reality which viewers perceive and that the present invention seeks to modulate. Thus, scenes (or even specific shots) within a single motion picture can have either the conventional cinematic look or the high-impact effect, at the discretion of the director of the picture. More significantly, image parts delivering the high-impact effect can be composited onto the same film frame as components delivering the conventional cinematic look. With the method described here, selected components of a film image can appear hyper-realistic when compared with other image components that the viewers observe simultaneously. As films prepared according to the present invention are shown, audiences will perceive that certain components of the action in the motion picture appear more realistic than other components of the action; thereby approximating the real-life situation where some events have a greater impact of a viewer's perception than others.

BRIEF DESCRIPTION OF THE INVENTION

This invention concerns the compositing of images onto the frames of motion picture film. It is desired that certain portions of such images appear to the audience viewing them as delivering conventional cinematic experience, while other portions of such composite images appear to give the audience the illusion of reality a delivered by high speed projection, as used in SHOWSCAN.

In the preferred embodiment of the invention, film sequences or components of images which will deliver the conventional "cinematic" impact to the audience are photographed at the conventional frame rate of 24 fps, while the "high-impact" film sequences or portions of images are photographed at the higher and nonstandard frame rate of 48 frames per second. It should be noted that 48 frames per second is a slower film transport speed than the range of 50 to 72 fps (and preferred rate of 60 fps) envisioned and claimed by Trumbull for SHOWSCAN (U.S. Pat. No. 4,477, 160 (1984)).

Scenes or portions of images for which a conventional "cinematic" look is desired are photographed at 24 fps in the conventional manner. Scenes or portions of images for which a high-impact presentation is desired are photographed (or animated and copied through an optical printer or using computer compositing techniques) at 48 fps. All frames are projected at the rate of 48 fps, whether or not high-impact presentation is desired for any particular scene. Sequences photographed at 24 fps are double-frame printed for projection at 48 fps.

Conventional Geneva movement projectors can be sued, but are not preferred for this application. With the length of time required for film pulldown using conventional moving sprockets, the amount of blanding time in each image cycle would prevent a substantial amount of light from reaching the screen; keeping light levels below the 18 footlamberts needed for a high-impact presentation, unless a nonstandard high-intensity light source is used. To show films made in accordance with this invention, it is preferable to use a projector which features high-speed pull-down and stationary pins for highly-accurate registration. Due to the high-speed pulldown, blanking time on each image cycle is reduced and light can be projected for a greater percentage of time. This allows for the screen brightness level of 18 footlamberts or more to help achieve a high-impact effect on the viewer, without the need for an inefficient and expensive high-intensity light source. An example of a projector that can be used in accordance with this invention is the "Linear Loop" projector manufactured by Pioneer Technology Corp. of Burbank, Calif.

On projection, all films are shown at the rate of 48 fps. with a double-bladed shutter, so the viewers are presented with 96 image impressions per second. For portions of images where the 24 fps "cinematic" look is desired each image is printed onto two successive frames of film for projection. The perception for the viewer would be the same as for conventional cinematic images projected at 24 fps. Strobing, motion blur and other artifacts associated with 24 fps photography would be retained since only 24 fresh images would be presented to the viewers during each second.

The present invention allows portions of a motion picture film to be photographed at 24 fps and projected to maintain the appearance of a 24 fps film, while other portions of the film are photographed and projected at 48 fps to deliver a super-realistic look with a dimensionality that is not available at 24 fps. Not only is this modulation of the intensity of the experience perceived by the viewers available between scenes of a motion picture; image components photographed (or animated) at both 24 fps and 48 fps can be composited together during a sequence. The audience would then perceive a mixing of high-impact, visually-dominating action along with other action that retains a cinematic appearance.

BRIEF DESCRIPTION OF THE DRAWINGS

The first three drawing figures represent motion picture film strips containing picture information. The portions of the film containing audio, time code and other nonpicture information are not depicted.

FIG. 1 shows a strip of film, photographed at 24 frames per second, depicting a blank background and a man in the foreground.

FIG. 2 shows a strip of film containing twice as many images as on the film in FIG. 1, such images being animated dinosaurs.

FIG. 3 shows a strip of film printed for projection at 48 frames per second, showing a composite of the images contained on the film strips depicted at FIGS. 1 and 2, with each image from FIG. 1 composited with two successive images from FIG. 2, with the resulting composite images showing the man depicted in FIG. 1 appearing to interact with the dinosaurs depicted in FIG. 2.

DETAILED DESCRIPTION OF THE INVENTION

Figure 4:
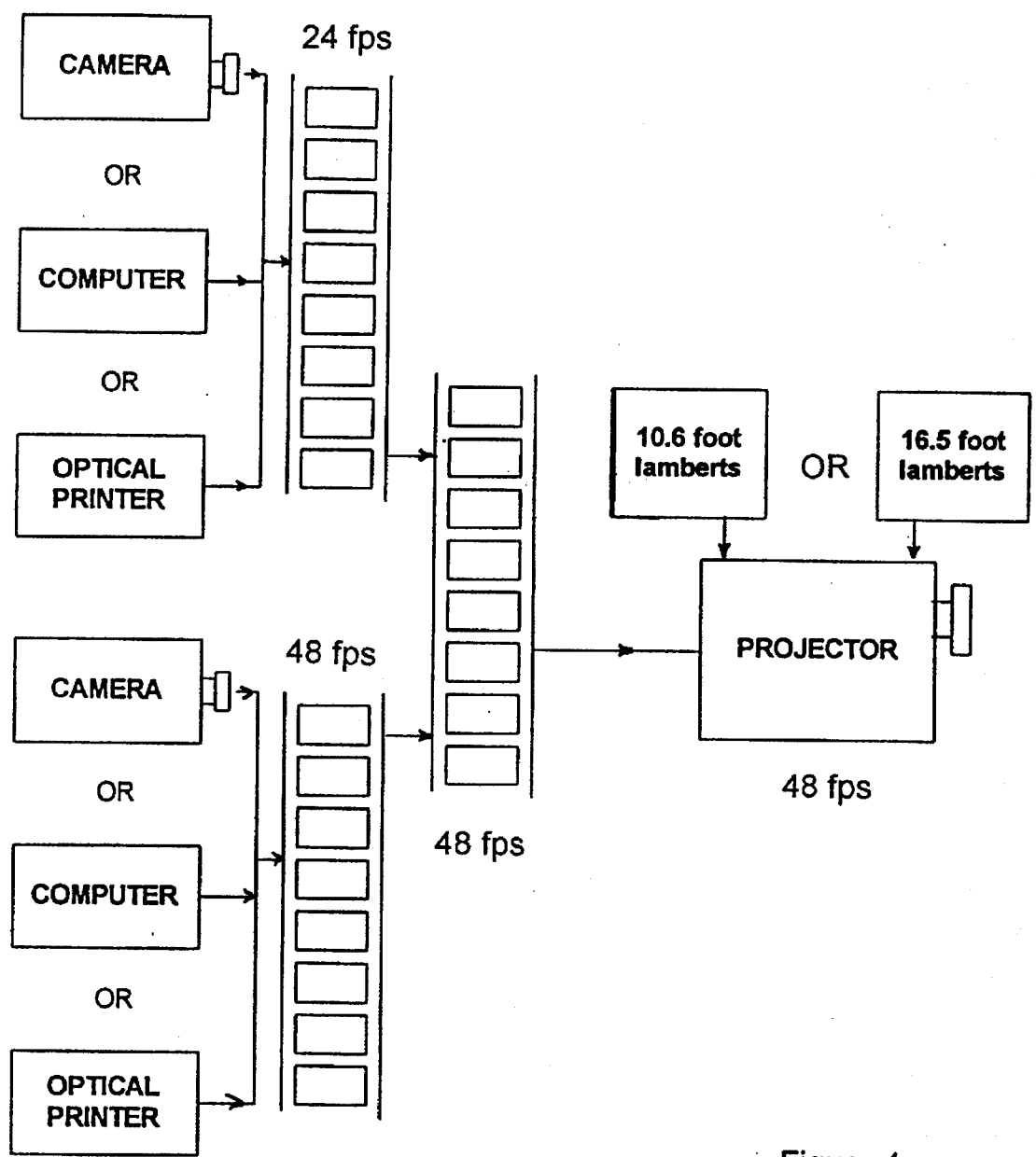
FIG. 4 shows a block diagram of the system used in the preferred embodiment of the invention. Film images from a camera, optical printer or computer are recorded onto separate film strips at 24 fps and 48 fps, these image components are composited onto another film strip, and this film strip is projected at a rate of 48 fps, with a light brightness level of typically 10.6 footlamberts (conventional light level) or 16.5 footlamberts or above (high brightness level).

The invention described herein is a method for combining two levels of visual impact simultaneously in a motion picture presentation. Certain image components are photographed at 24 frames per second and impart to the viewers of the film the sort of experience typically associated with the "cinematic" look of conventional 24 fps motion picture exhibition, including such artifacts as strobing, motion blur and interpolation of motion that does not quite appear smooth. For the purposes of this invention, these cinematic artifacts are desirable for cinematic artistry and essential to keep from overwhelming the viewers. By contrast, other image components are photographed at 48 frames per second. Because of the lifelike appearance of motion and lack of artifacts associated with 24 fpsm these image components appear palpably more realistic when viewed; they lack the "cinematic" look of 24 fps projection and appear far more realistic than the image components photographed at 24 fps. These two sequences photographed at different frame rates are composited together onto a single strip of film to produce an image that appears highly realistic in part and "cinematic" in the other.

The drawings provide an example. There were sequences in *Jurassic Park* where people (photographed running as live action) appeared to be chased by dinosaurs, which were computer-animated creations. In the actual post-production of *Jurassic Park*, the live-action images of the people running were composited with the computer-animated images of the dinosaurs, both at 24 fps. For the present invention, let us assume that similar live action images of a man running (FIG. 1) are composited with computer-animated dinosaurs (FIG. 2), although the dinosaur images are produced so that 48 of them are presented to the audience each second (along with 24 images of the man running and the background of the scene). FIG. 3 depicts the composited images resulting from the mixing of the image components in FIGS. 1 and 2. The images depicted in FIG. 3 will be projected to the audience at 48 fps, with each image component from FIG. 1 presented twice. What the viewers perceive is that the man in FIG. 1 appears "cinematic" and confined to the apparent plane of screen, while the dinosaurs depicted in FIG. 2 will appear much more real. Their motion will appear smoother than that of the man, and the dinosaurs will seem to be free from the confinement of the apparent plane of the screen. Thus, the dinosaurs will appear able to "pop out" from the confines of the screen and jump toward the audience, scaring the viewers even more than was possible in the original motion picture (produced entirely at 24 fps).

In converting from 24 to 48 fps, each image on FIG. 1 is printed twice, so image component 11 appears at composited images 31 and 31'; image component 12 is printed at composited images 32 and 32' and image component 13 is printed at composited images 33 and 33'. Adding the 48 fps image components from FIG. 2, image components 21 and 21' are mixed successively with image component 11 to form composited images 31 and 31'. Similarly image components 22 and 22' are mixed with image component 12 to form images 32 and 32' and image components 23 and 23' are mixed with image component 13 to form composited images 33 and 33'. This compositing treatment continues throughout the entire scene, as long as the filmmaker wishes to combine onto a single image both components which have the "cinematic" look of 24 fps and the high-impact look of 48 fps.

In the preferred embodiment of this invention, projection of films should be accomplished by a projector featuring high-speed pulldown and highly-accurate pin registration. Conventional Geneva projectors are suitable, but do not deliver the desired effect in its entirety. In the preferred embodiment of the invention, a Showstar "linear Loop" projector manufactured by the Pioneer Technology Corp. of Burbank, Calif. was used. In accordance with the method described, all projection is done at 48 fps. The high-speed pulldown projector is preferred because it can position the film frame in front of the light source in three to four miliseconds. The shutter can be open longer than with conventional projectors, which results in up to 55% more light with a double-bladed shutter than is available with the conventional Geneva projector (also using a double-bladed shutter).

In the invention disclosed here, the need for the special bright light source required by Trumbull in U.S. Pat. No. 4,447,160 and previously by Weisgerber in U.S. Pat. No. 5,096,286 is eliminated. With the high-speed pulldown projector capable of delivering 55% more light than a conventional projector, a conventional light source delivering 10.6 footlamberts can deliver the 16.5 footlamberts used by Trumbull and a light source capable of delivering 12.9 footlamberts with a conventional projector can deliver the twenty footlamberts previously recommended by Weisgerber.

Moreover, the psychological effects upon the viewer which Trumbull claimed to achieve with the 60 fps frame rate are available with the method described here. The presentation of 48 images to the viewer during each second leads to a comparable level of smoothness of motion to that obtained at 60 fps. However, at recommended light levels (16 footlamberts or more), flicker remains perceptable. For this reason, Trumbull claimed frame rates of 50 to 72 fps, not 48. Use of the double-bladed shutter at 48 fps, however, eliminates flicker by representing 96 impressions per second to the viewer. Thus, the beneficial effects of the Trumbull system are obtained at a frame rate outside the range of frame rates claimed by him.

It is also feasible to modify the method described here to highlight the difference between the "high-impact" and "cinematic" image components that the viewers see. In U.S. Pat. No. 5,096,286, Weisgerber taught the use of brighter light for "high-impact" scenes than for scenes which are designed to retain the "cinematic" look. In such instances, where it is desired that an entire scene be more visually impressive than other entire scenes, light level can be varied according to Weisgerber's previous invention. Similarly, Weisgerber also teaches the selective underexposure of certain film frames as printed to create the artifact of flicker when it is desired that the viewer of the film perceive flicker during the speed change. In the above-described invention, the portions of images to have the 24 fps "cinematic" look can be selectively underexposed to appear less bright than high-impact components of the image, while the high-impact scenes will appear brighter and more realistic.

In the preferred embodiment of the invention, the film format used is 70 mm film (65 mm negative) with five perforations per frame. With high-speed pulldown increasing the light that reaches the screen and pin-registration increasing the perceived resolution of the images projected onto the screen, it is possible to approach (or even exceed) the SMPTE standard of resulution of 60 line pairs/mm. In any event, the resolution available with the method described exceeds the 56 line pairs/mm claimed by Trumbull. While it is contemplated that the 70 mm/5-perf format will be used, the invention described can also accommodate any other standard and non-standard film format or guage. The resolution available to 35 mm will be less than at 70 mm, but it will still be significantly higher than conventionally available with standard 35 mm release prints, due to the use of pin-registered projection.

The increased amount of light reaching the screen due to high-speed pulldown projection, along with the increased resolution delivered by the pin-registered projection mechanism, allows a greater amount of magnification to be accomplished than was previously feasible. It is, therefore, possible to install larger screens in conventional motion picture theaters than had heretofore been possible. The invention described here facilitates a situation where all (or nearly all) of the audience members view a motion picture screen so large that the image will cover the entire "front" wall of the auditorium, from wall to wall and from floor to ceiling. Larger screens that can be used in accordance with this invention (as opposed to smaller screens necessitated by conventional methods and technology) can be masked through use of the methods taught by Vetter (U.S. Pat. No. 3,475,086 (1969)) (upper and side masks) and previously by Weisgerber (U.S. Pat. No. 5,121,086 (1992) (lower screen mask). With the use of these methods, the beneficial effects delivered by the invention described here are available with any standard or nonstandard film format, quickly and automatically.

The invention described here now allows the filmmaker to modulate the amount of impact that a component of an image will have upon the viewers of the film being produced; not only between scenes, but with simultaneous action within a single film sequence. While the method described here permits the compositing of high-impact and "cinematic" images together, it is not necessary that such compositing always be done. For example, the scene is a remote mountain lodge where people inside are looking through a window and expressing concern that a storm is brewing. At that particular point in the film, the story line is advanced by the dialogue between the characters; and not by the visual impact of the storm as viewed through the picture window. In fact, a high-impact impression of the storm may detract from the advancement of the story line of the film by delivering too much impact of the storm scene, when the viewer's attention should be given to the emotionality of the concerns of the characters. At this point in the film, the entire scene would be photographed at 24 fps and given the "cinematic" look. Suddenly, a plane crashes. As the characters give their attention to watching the crash scene, the viewer will also see the characters watching, but attention will be given mostly to the plane, as the characters watch it through the window. At this point, the characters are still photographed at 24 fps, but the diving plane has been photographed at 48 fps; thereby creating a significantly stronger visual effect as the plane goes down. As the plane hits the ground, only 48 fps will be used, as the crash itself demands full visual attention. The image of the characters inside the lodge has been eliminated, and the rescue scene will be photographed entirely in the high-impact 48 fps mode.

Using different film technologies to produce different levels of impact on the viewers is not new. As far back as the mid-1920s, color scenes were used selectively for the ballroom scene in *The Phantom of the Opera* (1925) and the Resurrection scene in *King of Kings* (1927). In *the Wizard of Oz*, Victor Fleming depicted events occurring in Kansas in black and white (with sepia tint) and the events occurring in the mythical land of Oz in full color, an effect achieved through scenic and costume design, not by compositing two images. Until now, there was no method available for compositing high-impact image components with other image components which retain the "conventional" look of the standard technology. The present invention also demonstrates the first use of different frame rates which are combined to advance a motion picture story line in real-time mode. In the present invention, the action does not appear to speed up or slow down, as conventional show-motion and fast-motion photography deliver. Instead, the different frame rates combine to deliver either a greater or lesser illusion of reality to the viewers of the film. In addition, high-impact image components can be joined with lower-impact image components to create a "dimensional" effect upon the viewers of the film, thus adding another variable that can be modulated under the creative control of the filmmaker.

This creative control can be used in many different ways. Live action photographed at 24 fps can be composited with other live action photographed at 48 fps, so that people who will appear "cinematic" to the viewers will be watching other people involved in action that will look highly realistic and dimensional. Live action can also be composited with animation. Live action photographed at 24 fps will give the impression that real people have been dropped into a cartoon setting. Live action photographed at 24 fps can also be composited with animation printed for 48 fps exhibition. Any style of animation can be used, from cartoon drawings to sophisticated computer-generated images. Animation at 24 images/sec. can also be combined with animation at 48 images/sec. In any application, the image components photographed are printed at 48 images per second deliver a dimensional effect not noticed at 24 images per second, since viewers perceive the screen itself as an artifact of 24 fps projection. The 48 fps images will appear to escape its bounds.

The method described is feasible for installation in any conventional motion picture theater, as opposed to such high-impact systems as IMAX and SHOWSCAN, whose lack of adaptability to the theatrical exhibition marketplace limit their use to special venues and make them unsuitable for full-length feature films.

Conventional equipment is used in the invention described, except that the preferred projector should be a high-speed pulldown, pin-registered type equipped to show films at 48 fps, through a double-bladed shutter. This configuration delivered 96 impressions per second to the viewers; two impressions of each image photographed or printed at 48 fps and four impressions of each image photographed or printed at 24 fps. In practice, the showing of 48 fps images twice will produce the high-impact effects described by Trumbull; while the showing of 24 fps images flashed four times (each image duplicated and then flashed twice) will retain the "cinematic" look associated with all 24-fps exhibition.

The method described also provides other advantages not available with other high-impact systems, in addition to the ability to selectively blend high-impact and conventional "cinematic" images. If a filmmaker does not wish to mix high and lesser-impact images, it is still possible to intercut high and lesser-impact scenes within a single picture, without the necessity of specially treating certain frames of film to accomplish a transition between two different frame rates. Moreover, the method described allows easy conversion from the 48 fps rate to the conventional 24 fps rate for general release. For 24 fps release, the images photographed or printed at 24 fps will remain intact. Images photographed or printed at 48 fps will be transferred by printing alternate frames to make prints for exhibition at 24 fps. The advantages of the dimensional high-impact scenes and images will be lost, but general release prints can be made without the difficulties encountered in converting from 60 fps to 24 fps, as described by Trumbull in U.S. Pat. No. 4,889,423.

The method described is available for use with any film format, and transfer of images can be accomplished through an optical printer or by use of computerized image transfer processes known in the art. To enhance audience impact, the improved resolution available permits greater magnification and, therefore, a larger screen to be fitted to the architecture of the auditorium than had heretofore been feasible.

No change is made in the physical film stock; only the frame rates are varied and selected to produce the desired effect. Audio and other non-picture information can be recorded onto the film to be shown in the usual ways known in the cinema art. Due to the high-impact nature of some of the images to be presented, however, it is expected that the sound system used will also present an appropriate degree of auditory impact.

For use outside the United States and Canada, where 50 Hz. AC is used instead of 60 Hz., no modification of frame rates will be needed. Any film format may be used in accordance with this invention, but 70 mm film will deliver more resolution than 35 mm. In any event, the use of the invention described will greatly improve the visual dynamics of the dimensionality of the film upon the viewers of motion pictures, over that available with conventional 35 mm release prints (with easy conversion to that format, when desired).

This invention expands the creative latitude available to the filmmaker. It is now possible to modulate audience perception of reality in an easy and relatively inexpensive manner, and to an extent not possible until now. The examples described for applications of this method should be viewed as illustrative, and not limiting. Other prospective applications and embodiments of this invention should be considered as lying within its scope.

The invention claimed is:

1. A method for imparting different image components onto a strip of motion picture film for exhibition to audiences, with the resultant image imparted onto said film strip delivering in part a greater visual impact, and in other part a lesser visual impact to members of said audiences, comprising:

a. photographing or printing successive visual image components photographed or printed at a frame rate of twenty-four frames per second, with the intention that said image components will deliver to the members of said audiences the visual impact typically associated with the viewing of motion pictures;

b. photographing or printing successive visual image components which are different from those photographed or printed onto the first strip of motion picture film onto a second strip of motion picture film; said image components photographed or printed at a frame rate of forty-eight frames per second, with the intention that said image components will deliver to the members of said audiences a visual effect that heightens the impact of the illusion of realism on said audience members, in comparison with the image components photographed or printed onto said first strip of film; and c. superimposing the image components on said first strip of motion picture film and the image components on said second strip of motion picture film onto a third strip of motion picture film, for exhibition to motion picture audiences at the same frame rate as the second strip of film; said third strip of motion picture film further containing audio and other nonpicture information normally imparted on such films for exhibition.

2. The method as in claim 1, whereby such superimposition is accomplished by means of optical printing or computerized image transfer.

3. The method as in claim 1, whereby the frame rate at which image components are recorded onto said second strip of motion picture film is double the frame rate at which image components are recorded onto said first strip of motion picture film.

4. The method as in claim 3, whereby the image components recorded onto said first strip of motion picture film are each transferred twice, onto two successive frames of said third strip of motion picture film, composited with each successive image component transferred from said second strip of motion picture film; with said third strip of motion picture film containing a composite image made up of said image components from said first and second strips of motion picture film; said third strip of motion picture film to be projected in a motion picture theater at the same frame rate at which said image components were recorded onto said second strip of motion picture film.

5. The method as in claim 3, in which the image components recorded onto said first strip of motion picture film are recorded at the rate of twenty-four frames per second, and the image components recorded onto said second strip of motion picture film and the image components transferred to said third strip of motion picture film are recorded and transferred at the rate of forty-eight frames per second.

6. The method as in claim 1, in which said image components are recorded onto said first and second strips of motion picture film by means of photographing live action, cartoon animation or computerized animation.

7. The method as in claim 5, whereby the images transferred onto said third strip of motion picture film are exhibited to said audiences at the rate of forty-eight frames per second, through a projector equipped with a double-bladed shutter, resulting in the delivery of two flashes of light per image and ninety-six impressions of light per second to the persons viewing said film.

8. A strip of motion picutre film for exhibition to audiences in motion picture theaters at a frame rate of forty-eight frames per second, where the images recorded onto said film strip are composited by combining separate components of said images; certain components of said images being recorded at a frame rate of twenty-four frames per second, and other components of said images being recorded at a frame rate of forty-eight frames per second; said motion picture film being exhibited to audiences at forty-eight frames per second, with the result that the members of said audiences perceive a visual impact of greater magnitude from selected components of the images on said motion picture film than they perceive from the components of said images which are not so selected.

9. The strip as in claim 8, in which the image components composited onto said strip were originally recorded onto other strips of motion picture film for transfer onto said strip, through photography of live action, cartoon animation of computerized animation techniques.

10. The strip of motion picture film as in claim 8, whereby entire scenes which are recorded at forty-eight frames per second are intercut with other scenes recorded at twenty-four frames per second, with the result that the members of said audiences perceive a greater visual impact during the scenes recorded at forty-eight frames per second and a lesser visual impact during the scenes recorded at twenty-four frames per second.

11. A strip of motion picture film as in claim 10, which is exhibited to said audiences at said higher frame rate.

12. A strip of motion picture film as in claim 11, during the exhibition of which said scenes recorded at forty-eight frames per second are shown through a projector with a light source capable of delivering a light level of 16.5 footlamberts or more, while the scenes originally recorded at twenty-four frames per second are shown through the same projector with said light source limited to delivering, a light level of 10.6 footlamberts or less, with the effect that the scenes originally recorded at said higher frame rate appear to the members of said audiences to be more brightly illuminated than the scenes on said motion picture film originally recorded at said lower frame rate.

13. A method for producing motion picture films for theatrical audiences that delivers to the members of said audiences a greater visual impact in some components of the images comprising said motion picture films than is delivered by other components of said images; said greater or lesser visual impact being imparted at the discretion of the maker of such films; such method comprising the imparting onto said motion picture films image components recorded onto such films at a frame rate of twenty-four frames per second and further imparting onto such films other image components recorded onto such films at a frame rate of forty-eight frames per second; where the improvement consists of the superimposition of images recorded at different frame rates onto a film exhibited at the higher of said different frame rates to said audiences.

* * * * *